United States Patent [19]

Lowdenslager et al.

[11] 4,279,028

[45] Jul. 14, 1981

[54] WATCH WITH BAROMETRIC PRESSURE INDICATOR

[75] Inventors: John Lowdenslager, Norwalk; Alan E. Willis, Stamford, both of Conn.

[73] Assignee: Timex Corporation, Waterbury, Conn.

[21] Appl. No.: 83,434

[22] Filed: Oct. 10, 1979

[51] Int. Cl.³ .............................................. G04B 47/00
[52] U.S. Cl. ...................................... 368/11; 368/10; 73/170 R
[58] Field of Search ............... 58/23 R, 152 R, 152 A, 58/50 R, 23 A; 340/762, 765, 784, 782, 581; 73/384, 385, 386, 387, 170 R, 754; 368/10, 11

[56] References Cited

U.S. PATENT DOCUMENTS

| | | | |
|---|---|---|---|
| 2,716,327 | 8/1959 | Franklin et al. | 73/384 X |
| 3,355,949 | 12/1967 | Elwood et al. | 73/170 R |
| 3,653,203 | 4/1972 | Hurt | 73/384 X |
| 3,937,004 | 2/1976 | Natori et al. | 58/152 A X |
| 4,015,208 | 3/1977 | Hammer et al. | 58/23 A X |
| 4,163,230 | 7/1979 | Konii | 368/11 X |

Primary Examiner—Ulysses Weldon

[57] ABSTRACT

A solid state digital watch and barometric pressure indicator having a sealed quartz crystal and a second unsealed quartz crystal which changes frequency with atmospheric pressure changes. The frequency variation of the unsealed quartz crystal is measured over a selected (interrogation) period and some number proportional to the frequency variation, which is indicative of the magnitude of atmospheric pressure change, is displayed with an appropriate sign to indicate increasing or decreasing atmospheric pressure.

6 Claims, 1 Drawing Figure

WATCH WITH BAROMETRIC PRESSURE INDICATOR

BACKGROUND OF THE INVENTION

This invention relates to barometric indicators, and in particular to an electronic wrist instrument for providing time and barometric pressure information.

Barometers and baroscopes are known instruments for measuring the pressure of the atmosphere. Generally, these devices are either of the aneroid or mercury barometer type.

The prior art also includes various electronic devices which are compensated for various parameters of the environment such as is described in U.S. Pat. Nos. 4,015,208 issued Mar. 29, 1977 to Walter Hammer et al; 3,999,370 issued Dec. 28, 1976 to Shigeru Morokawa et al; 3,938,316 issued Feb. 17, 1976 to Shigeru Morokawa et al; and 4,021,898 issued May 10, 1977 to Alan E. Willis and Jack Schwarzschild.

In contrast to the prior art, the present invention provides an electronic timepiece which combines the capabilities and advantages of both a timepiece and a barometric pressure variation indicator, is adapted for case of use by the user and involves a minimum of associated parts.

SUMMARY OF THE INVENTION

In the preferred embodiment of the invention, a solid state digital watch functions to provide barometric pressure information. The hermetically sealed crystal micro-resonator provides a time base for measuring the frequency of a second unsealed quartz crystal micro-resonator during a predetermined period of time. The frequency of the unsealed crystal is selectively interrogated and the magnitude and direction, i.e., increasing or decreasing, of the frequency during successive interrogations is measured and correlated to a constant, increasing or decreasing barometric pressure. The watch in response to a manually actuatable swtich displays an indication of the magnitude and direction of any variation in the barometric pressure between interrogation intervals.

Accordingly, an object of the present invention is to provide a new and improved method of measuring variations in the barometric pressure.

Another object of the invention is to provide a device for measuring variations in the barometric pressure.

A further object of the invention is to provide a wrist instrument for providing both time and barometric pressure information.

A still further object of the invention is to provide a digital display electronic timepiece which selectively also displays an indication of the magnitude and direction of barometric pressure variations over selected periods.

BRIEF DESCRIPTION OF THE DRAWINGS

Other objectives and advantages of the present invention will be apparent from the following detailed description of the preferred embodiment of the present invention, the description being taken in conjunction with the accompanying drawings.

DESCRIPTION OF THE PREFERRED EMBODIMENT

Figure 1:
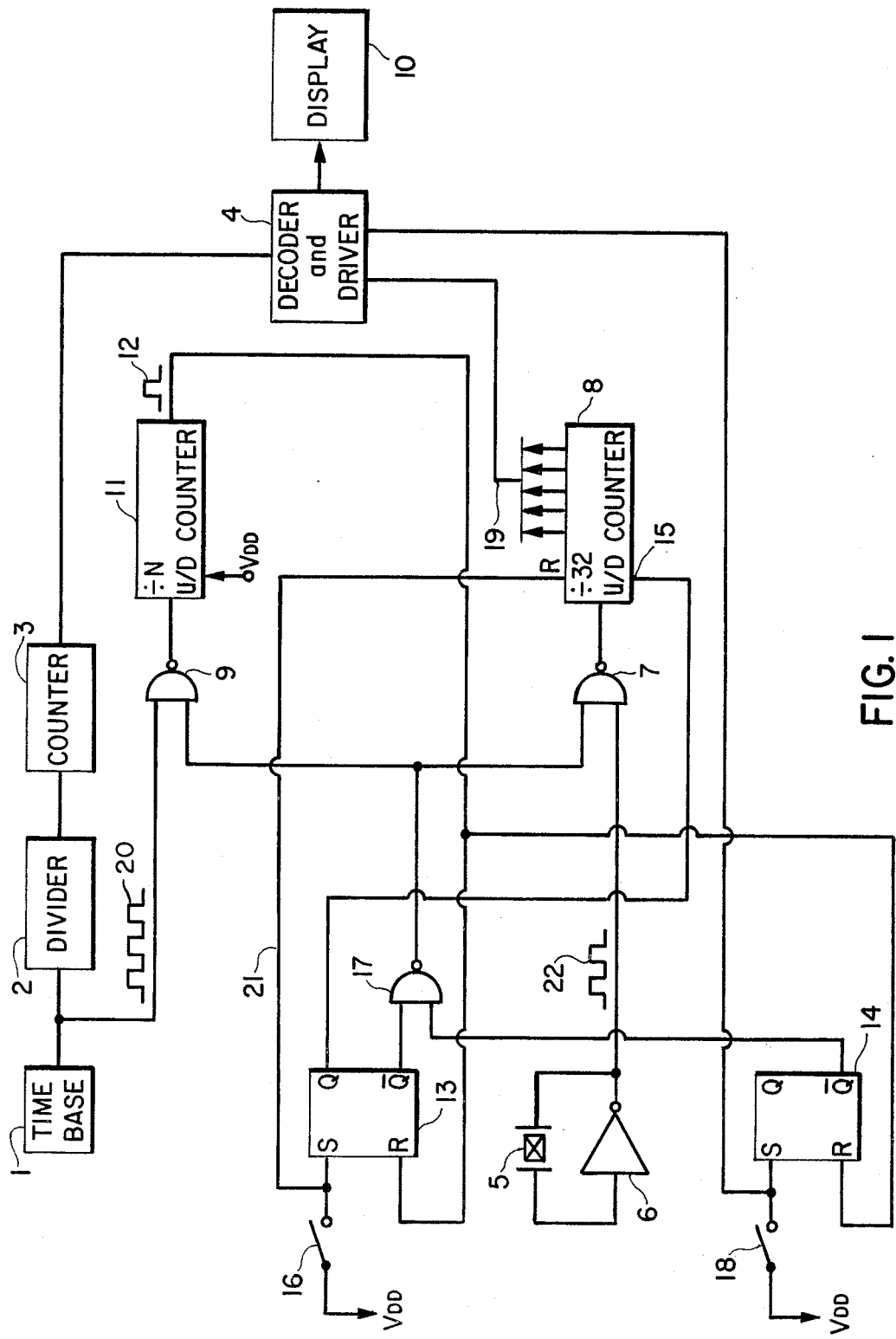
FIG. 1 is a schematic block diagram of an electronic timepiece having barometric variation detection apparatus according to the present invention.

FIG. 1 shows a block diagram of a digital watch with an electrooptical display 10 and barometric pressure detecting circuitry. The watch comprises a time base 1 of a known type, for example, a quartz crystal controlled oscillator having a frequency of 32,768 Hz. The quartz crystal micro-resonator of time base 1 is hermetically sealed to maintain the desired (time base) frequency.

The display is actuated to display time information by electronic circuitry which generally consists of the frequency (time base) standard 1, frequency dividing unit 2, time counters 3 and a decoder driver 4. Since circuitry for performing these functions is well known to those skilled in the art such as described in U.S. Pat. No. 3,754,392 issued Aug. 28, 1973 to R. Gary Daniels, exhaustive details thereof are omitted to avoid prolixity.

The barometric (pressure) variation detection apparatus utilizes the principle that an unsealed piezoelectric resonator 5 coupled to an amplifier will provide a generator means whose frequency will vary inversely with changes in the ambient pressure. Thus, as the atmospheric or ambient pressure drops, the frequency of the micro-resonator 5 increases. On the other hand, if the atmospheric pressure increases, the frequency of the micro-resonator 5 decreases. Any variation in the frequency of the micro-resonator 5 over a selected period can be correlated to the magnitude of the increasing or decreasing atmospheric pressure.

The circuit illustrated in FIG. 1 is designed to enable manual control of the selected period between frequency measurements of the micro-resonator 5.

The micro-resonator 5 is connected across an amplifier 6 to form a variable frequency oscillator having its output connected to one input of a NAND gate 7. The output of the NAND gate 7 is connected to the input of an up/down counter 8. The other input of NAND gate 7 is connected to an input of NAND gate 9 and the output of NAND gate 17. The other input of NAND gate 9 is connected to the output of the time base 1 and its output is connected to the input of a divide by N counter 11 which in this embodiment is an up/down counter set to operate in the up count mode.

The divide by N counter 11 provides a predetermined time count during which time period, the output frequency of the micro-resonator 5 is measured. The time count is a constant determined by the fixed frequency of the sealed crystal controlled oscillator of the watch time base 1 and the value of divisor N entered into counter 11. The counter 11 is connected to $V_{DD}$ so that it always counts up, and provides a carry pulse when its end of cycle is reached. The value of N is selected either by calculation or empirically to provide a suitable correlated scale and resolution, such as one bit or increment per 1/100 inch (mercury) atmospheric pressure.

For example, for an expected change in a 32 KHz micro-resonator 5 of 5 PPM (part per million) per inch of mercury and with $N = 2 \times 10^6$, the count of counter 11 will take 66 seconds and the output will correlate to one increment per tenth of an inch of mercury. Similarly, if $N = 2 \times 10^7$, the count of counter 11 will take approximately eleven minutes, and the output can indicate a correlation to 1/100th inches of mercury.

The output count pulse 12 of counter 11 is coupled to the reset of flip-flops 13 and 14.

The Q output of flip-flop 13 is connected to the up-/down control terminal 15 of up/down counter 8. The Q output of flip-flop 13 is connected to one input of NAND gate 17 and its other input is connected to the Q output of flip-flop 14.

The set input S of flip-flop 13 is connected to the reset R of up/down counter 8 and, via a manually actuatable switch 16, may be momentarily connected to a logic 1 or positive potential $V_{DD}$.

The set input S of flip-flop 14 is connected to the display decoder driver 4 and, via a manually actuatable switch 18, is selectively connected to a logic 1 or positive potential $V_{DD}$.

The binary coded decimal information, i.e., the output count 19 of counter 8, is coupled to the decoder driver circuit 4. The decoder driver 4, in response to the position of switch 18, provides output signals to the digital display 10.

In response to the manually actuatable switch 18 and the control signals from the decoder driver 4, the display 10 is energized to display either time or barometric pressure information.

In operation, switch 16 is momentarily closed which resets counter 8, via lead 21, and sets the count 1 flip-flop 13. In the set mode, the Q and Q outputs of flip-flop 13 are high (logic 1) and low (logic 0) respectively. The high Q output of flip-flop 13 is coupled to the up/down (U/D) control terminal 15 of counter 8 which places counter 8 in an up-count mode. The low output on the Q terminal of flip-flop 13 causes the output of NAND gate 17 to go high which enables NAND gates 9 and 7.

With NAND gates 9 and 7 enabled, pulses 20 and 22 are coupled to the counter inputs of counters 8 and 11 respectively.

Counter 8 being in the up-count mode counts the input pulses 22, whose rate is controlled by micro-resonator 5, until NAND gate 7 is disabled. NAND gates 7 and 9 are both disabled when flip-flops 13 and 14 are reset by a carry (pulse) signal 12 of counter 11 which inhibits both counters 8 and 11. The carry (pulse) signal 12 is a predetermined count output of counter 11.

The count remains held in counter 8 until switch 18 is closed.

When switch 18 is selectively closed, flip-flop 14 is set causing NAND gates 7 and 9, via NAND gate 17, to be enabled. With NAND gates 7 and 9 enabled, counters 8 and 11 are enabled to begin a second count cycle.

Since the Q output of flip-flop 13 is low, as a result of the previous carry (pulse) signal 12 resetting flip-flop 13, the low signal at input 15 of counter 8 causes it to count down from the number accumulated therein during the first count cycle.

As noted above, the period during which counters 8 and 11 are enabled is a predetermined constant dependent on the fixed frequency of pulses 20.

At the end of the second count cycle, a remainder or frequency differences count signal is provided on output 19 and coupled to the decoder driver 4. The remainder count is indicative of the frequency shift of the micro-resonator 5 between the two counts, i.e., the time between the up-count and down-count cycles of counter 8. The period between the two counts is selected by the operator by actuation of the switches 16 and 18. The decoder driver in response to actuation of switch 18, actuates a conventional switching circuit which disconnects coded BCD time information from the driver and connects BCD coded barometric pressure information. The decoder-driver thus monitors or scans the remainder count and energizes the display to display a digital number and/or other indicia correlated to signify the magnitude and direction of the changed barometric pressure.

Of course, it should be recognized that electronic switches controlled by preselected time counts, for example from counter 3, can be utilized to periodically effect control of flip-flops 13 and 14 to produce an automatic barometric pressure variation display update, for example, every three hours.

If micro-resonator 5 has not changed frequency, counter 8 will have counted down as many pulses as it counted up, and will read zero.

If the frequency shift of micro-resonator 5 has not exceeded a predetermined number of parts in N counts of counter 11, e.g., 32 parts in N correlated to the maximum expected variation in atmospheric pressure, then the count signal 19 will be proportionate to the atmospheric pressure variations between up-down counts of counter 8. This count signal is correlated to a suitable scale and resolution for read out on the display 10.

The following table is a code of significant binary coded decimal signal outputs 19 correlated to the magnitude and direction, i.e., positive or negative, pressure changes using an up-down counter 8 comprising RCA 4029 counters to provide five output stages, e.g., a maximum count capability of ±16 in N count of counter 11.

TABLE 1

| ATMOSPHERIC PRESSURE CHANGE (PSI) | SIGNIFICANT BITS OF COUNTER 8 | DISPLAY |
| --- | --- | --- |
| 0.05 | 00101 | .05 |
| 0.04 | 00100 | .04 |
| 0.03 | 00011 | .03 |
| 0.02 | 00010 | .02 |
| +0.01 | 00001 | +.01 |
| 0 | 00000 | 0 |
| −0.01 | 11111 | −.01 |
| 0.02 | 11110 | .02 |
| 0.03 | 11101 | .03 |
| 0.04 | 11100 | .04 |
| 0.05 | 11011 | .05 |

We claim:

1. In an electronic timepiece wherein a time reference signal having a frequency is generated by an oscillator having a sealed quartz crystal micro-resonator and fed to a divider that divides the time reference signal into time-count unit signals that are fed to and counted by a time counter to form time-indicating signals that are in turn fed to a decoder driver unit which actuates an electrooptical display device to give a visual representation of time, the improvement comprising an atmospheric pressure variation indicator including:

generator means for providing an alternating signal having a frequency varying in proportion with atmospheric pressure variations;

means for periodically measuring the frequency of said alternating signal at selected intervals and subtracting two consecutive frequency measurements from each other to provide a difference signal indicative of the difference in frequency between successive measurements of said alternating signal; and circuit means coupled to said display device and responsive to said periodic frequency measuring means for selectively applying said difference signal to the display device so as to enable the display device to display indicia indicative of the difference signal which is correlated to increasing or decreasing magnitude of the atmospheric pressure variations between said successive measurements.

2. A timepiece as in claim 1, wherein:
the generator means includes an unsealed quartz crystal micro-resonator having a frequency which varies in proportion to atmospheric pressure variations.

3. In combination:
a digital display wristwatch comprising a quartz crystal controlled oscillator for generating a relatively high frequency time standard signal, divider means responsive to the time standard signal to produce low frequency timekeeping signals, counting circuit means responsive to the timekeeping signals adapted to count specific units of time and provide binary coded decimal information signals representative of time, decoder driver means responsive to the binary coded decimal information signals to provide drive signals to said digital display to display digital information correlated to the information signals whereby time information is presented on the digital display; and an atmospheric pressure variation detecting means comprising an unsealed piezoelectric crystal oscillator circuit for generating barometric pulse signals having a frequency which varies with atmospheric pressure, a first NAND gate having one of its inputs being coupled to said barometric pulse signals and its other input coupled to a control signal output of a second NAND gate for periodically coupling said barometric pulse signals to a counter input terminal of an up/down counter, said up/down counter having a control up/down terminal being responsive to a high-low output state of the Q output of a first flip-flop circuit and the barometric pulse signals to first count-up and subsequently count-down the pulses of said barometric pulse signals to provide a binary code decimal difference signal representative of any frequency variation of said barometric pulse signals to said decoder driver, said first flip-flop circuit includes a Q output connected to one input of said second NAND gate and a reset connected to a reset of a second flip-flop and being connected to a time reference output of an N counter, said first flip-flop having a set terminal connected to a reset of said up/down counter and a first switch means for selectively setting said first flip-flop and resetting said up/down counter, said second flip-flop having a Q output connected to the other input of said second NAND gate and a set terminal connected to said decoder driver and to a second switch means for selectively setting the second flip-flop and enabling the decoder-driver to provide drive signals to display said difference signal, said N counter includes a counter input terminal connected to the output of a third NAND gate having one of its inputs coupled to the output of said time base and its other input connected to the output of said second NAND gate;

whereby said atmospheric pressure variation detecting means responds to a variation in atmospheric pressure a selected time period and is adapted to effect actuation of said digital display to display a digital number being correlated to atmospheric pressure variations.

4. The combination as in claim 3, wherein:
the first and second switch means each comprise a manually actuatable switch.

5. In an electronic timepiece wherein a time reference signal having a frequency is generated by an oscillator having a sealed quartz crystal micro-resonator and fed to a divider that divides the time reference signal into time-count unit signals that are fed to and counted by a time counter to form time-indicating signals that are in turn fed to a decoder driver unit which actuates an electrooptical display device to give a visual representation of time, the improvement comprising an atmospheric pressure variation indicator including:

first switch means, generator means for providing an alternating signal having a frequency varying in proportion with atmospheric pressure variations, means for periodically measuring the frequency of said alternating signal and subtracting consecutive frequency measurements from each other to provide a difference signal indicative of the difference in frequency between successive measurements of said alternating signal, including an up/down counter responsive to said first switch means to be periodically coupled to said alternating signals, and circuit means coupled to said display device and responsive to said periodic frequency measuring means for selectively applying said difference signal to the display device so as to enable the display device to display indicia indicative of the difference signal which is correlated to increasing or decreasing magnitude of the atmospheric pressure variations between said successive measurements.

6. A timepiece as in claim 5, and having second switch means wherein:
the circuit means includes a decoder driver circuit connected to the up/down counter and responsive to said period frequency measuring means and to said second switch means for selectively applying said difference signal and for activating the display device to display a digital number indicative of the atmospheric pressure variation.

* * * * *